United States Patent [19]

Urban

[11] 3,773,662

[45] Nov. 20, 1973

[54] TREATMENT OF A THIOSULFATE SOLUTION WITH HYDROGEN SULFIDE

[75] Inventor: Peter Urban, Northbrook, Ill.

[73] Assignee: Universal Oil Products Company, Des Plaines, Ill.

[22] Filed: June 16, 1972

[21] Appl. No.: 263,509

[52] U.S. Cl..................... 210/50, 210/60, 423/562, 423/573
[51] Int. Cl.............................................. C02c 5/04
[58] Field of Search ................ 210/50, 60; 423/562, 423/573

[56] References Cited
UNITED STATES PATENTS
3,536,618   10/1970   Urban et al............................ 210/50

Primary Examiner—Michael Rogers
Attorney—James R. Hoatson, Jr. et al.

[57] ABSTRACT

An aqueous stream containing a water-soluble thiosulfate compound is treated to substantially lower the thiosulfate content thereof and to produce elemental sulfur by the steps of: (a) reacting the aqueous stream with an amount of $H_2S$ selected to provide greater than 2 moles of $H_2S$ per mole of thiosulfate at polysulfide formation conditions selected to form an effluent stream containing the corresponding polysulfide compound and unreacted $H_2S$; (b) rapidly cooling the total effluent stream from step (a) to a temperature effective to decompose at least a portion of the resulting polysulfide compound and form elemental sulfur without substantially changing the pressure of the effluent stream; (c) separating sulfur from the resulting cooled effluent stream without changing the pressure of same; and (d) reducing the pressure of the resulting cooled and substantially sulfur-free effluent stream to yield a treated water stream having a substantially reduced thiosulfate content and an $H_2S$-containing gas stream. Principal utility of the disclosed treatment procedure is associated with the clean-up or regeneration of aqueous streams containing undesired thiosulfate compounds so that they can be reused in the process which originally produced them or discharge into a suitable waste water sewer or stream without causing a major pollution problem. Key features of the disclosed method are: (1) operation of the reaction step with excess amounts of hydrogen sulfide so that unreacted hydrogen sulfide is present in the effluent therefrom; (2) rapid cooling of the total effluent stream from the reaction step under a positive hydrogen sulfide partial pressure; and (3) separation of $H_2S$ from the product stream only after the separation of sulfur.

12 Claims, No Drawings

TREATMENT OF A THIOSULFATE SOLUTION WITH HYDROGEN SULFIDE

The subject of the present invention is a multi-step method for the selective treatment of an aqueous stream containing a water-soluble thiosulfate compound in order to convert the thiosulfate compound to elemental sulfur and to lower the total sulfur content (i.e., the total amount of sulfur contained in the solution in any form, calculated on an elemental sulfur basis) of the aqueous stream to the point where it can be reused in the process in which it originated or it can be safely discharged into a suitable sewer without causing a major pollution problem. More precisely, the present invention involves a novel four-step method for treating an aqueous stream containing a water-soluble thiosulfate compound wherein the thiosulfate compound is first reacted with $H_2S$ under conditions selected to result in a relatively rich polysulfide compound, the resulting polysulfide compound is at least partially decomposed by rapid cooling under a positive $H_2S$ partial pressure, sulfur is then recovered from the resulting cooled solution without substantially changing the pressure of the effluent stream, and finally $H_2S$ is separated from the resulting cooled and substantially elemental sulfur-free effluent stream at a reduced pressure to form a treated water stream of greatly reduced thiosulfate content. In one specific aspect the present invention involves a method for the treatment of an aqueous stream containing sodium thiosulfate to produce elemental sulfur and treated aqueous stream, which has a greatly reduced total sulfur content relative to the input thiosulfate-containing aqueous stream, by a procedure which involves the production of an effluent stream containing a relatively rich sodium polysulfide compound and unreacted $H_2S$ effluent stream containing a relatively rich sodium polysulfide compound and unreacted $H_2S$ by a reaction between $H_2S$ and the input solution and the subsequent decomposition of same to yield elemental sulfur by means of a cooling step and a sulfur separation step both of which are conducted under a positive $H_2S$ partial pressure. In another important aspect, the present invention relates to the treatment of a rich absorbent stream (which is produced by scrubbing a gas stream containing sulfur dioxide with an aqueous absorbent containing an alkaline reagent and a reducing agent, selected from the group consisting of finely divided sulfur, a water-soluble sulfide compound, a polysulfide compound and mixtures thereof, at conditions selected to form a rich absorbent stream containing substantial amounts of the corresponding thiosulfate compound) in order to convert the thiosulfate compound contained therein in a selective manner to elemental sulfur and to regenerate the aqueous absorbent solution so that it can be reused to absorb additional quantities of sulfur dioxide.

As part of the price that has to be paid for a modern industrial society, large quantities of aqueous solutions of thiosulfate compounds are currently produced in a number of industrial processes. In particular, aqueous solutions containing ammonium thiosulfate are an undesired side product of many economically significant industrial processes in the chemical, petroleum, natural gas, paper and steel industries. For instance, in the petroleum industry an aqueous solution containing ammonium thiosulfate is produced as a drag stream from sulfur recovery systems that employ an oxidation method to recover sulfur from ammonium hydrosulfide solutions, which are commonly available as side streams from such typical refinery processes as hydrorefining, hydrocracking, catalytic cracking, etc. Another source of these thiosulfate-containing streams are processes for natural gas sweetening, coal gas purfication, town gas purification, and the like processes wherein hydrogen sulfide is scrubbed from a gaseous mixture containing same, and thereafter oxidized to elemental sulfur in a regeneration step. In these latter types of processes, an inevitable side reaction appears to be one leading to the formation of a thiosulfate salt which can then accumulate in the absorbent solution. The net amount of the thiosulfate by-product being produced must then be continuously or periodically purged from the system by discarding a drag stream. For example, in the Ferrox process for nautral gas sweetening or for coal gas purification, where iron oxides suspended in an alkaline, aqueous solutions are used to extract $H_2S$ from the gas stream and where the used scrubbing solution is regenerated by air oxidation, formation of a thiosulfate salt is observed as by-product in the regeneration step, and a drag stream containing this salt must be periodically discarded. Another pertinent example is in the Thylox process. This process is typically utilized for coke-oven gas treating and employs a treating solution comprising arsenic trioxide and sodium carbonate dissolved in water. The regeneration of the rich scrubbing solution is by air oxidation in a separate oxidizing zone. Once again, a drag stream containing thiosulfate salts and water-soluble thiocyanate salts is removed from this process in order to purge the net make of thiosulfate, and this stream results in a requirement for continuous replacement of sodium carbonate and arsenic trioxide. Yet another example is the Perox process which utilizes an aqueous ammonium solution containing an organic oxidation catalyst and which regenerates the rich solution by oxidation with air with consequential thiosulfate by-product formation and requirement for a thiosulfate-containing drag stream.

The production of an aqueous stream containing a water-soluble thiosulfate compound can also be accomplished during the course of a process for removing $SO_2$ from a gas stream containing same. In my U. S. Pat. No. 3,644,087 I have previously disclosed how an $SO_2$-scrubbing step can be operated to produce a rich absorbent stream containing substantial amounts of a water-soluble thiosulfate compound. In particular, I have demonstrated how the operation of a conventional $SO_x$ scrubbing step which uses an aqueous absorbent containing a conventional alkaline reagent such as the carbonate, bicarbonate sulfite or hydroxide salts of ammonia, the alkali metals or the alkaline earth metals can be modified to suppress the production of undesired, intractable sulfate by-products by the operation of the scrubbing step with the continuous injection of a reducing agent, selected from the group consisting of finely divided elemental sulfur, a water-soluble sulfide compound, a polysulfide compound and mixtures thereof, under thiosulfate production conditions effective to produce a rich absorbent stream containing substantial amounts of a water-soluble thiosulfate compound. The rich absorbent stream recovered from such a modified $SO_2$-scrubbing method is a particularly preferred input stream for the method of the present invention.

Regardless of the source of the aqueous stream containing a thiosulfate compound, it is clear that there is a substantial need for a method of treating the thiosulfate solution in order to remove the thiosulfate compound and allow either the reuse of the resulting treated aqueous stream in the process which produced it or the safe discharge of the resulting stream in sewers and/or rivers and streams. The first alternative is particularly advantageous when thiosulfate-containing stream also contains other valuable reagents such as in the Thylox process previously mentioned wherein the drag stream also contains sodium carbonate and arsenic trioxide. In addition, the growing sensitivity of the public to the adverse effects of indiscriminate discharge of waste stream by the chemical and petroleum industry provides an additional incentive for treating these thiosulfate-containing streams prior to their discharge into sewer systems.

In a case of particular interest, hydrorefining or hydrocracking of petroleum distillates containing nitrogenous and sulfurous contaminants, large quantities of ammonia and hydrogen sulfide are present in the effluent from the hydrocarbon conversion zone. These contaminants are generally absorbed in an aqueous absorbent solution which is injected into the effluent train of condensers and separating zones associated with the hydrocarbon conversion process. This results in an aqueous stream containing ammonium hydrosulfide ($NH_4HS$). As discloed in my U. S. Pat. Nos. 3,530,063; 3,531,395; 3,536,618; and 3,536,619, this stream can thereafter be subjected to an oxidizing step in order to recover sulfur therefrom or to reduce the biochemical oxygen demand thereof. Despite stringent precautions a minor amount of thiosulfate salt (i.e, $(NH_4)_2S_2O_3$) is inevitably formed as a side product in this oxidation step. The resulting ammonium thiosulfate-containing aqueous solution withdrawn as effluent from this oxidation step cannot be directly reused to recover an additional portion of ammonium hydrosulfide because, if it is injected into the effluent train associated with the hydrorefining or hydrocracking process, the hydrogen sulfide and/or ammonium hydrosulfide present in this effluent can react with the ammonium thiosulfate to produce free sulfur which can contaminate the hydrocarbon product from this process leading to severe corrosion problems in downstream equipment. Accordingly, there is a substantial need for a method of treating an aqueous solution containing ammonium thiosulfate compound in order to allow reuse of the treated aqueous stream within the process which produced it.

Quite understandably in recent years, attention has been focused upon a search for a method of treating such an aqueous solution in order to connect the thiosulfate compounds contained therein into products that either can be easily separated from the treated aqueous stream or that do not adversely affect the characteristics of the treated water stream when it is discharged or reused, thereby allowing a reuse of the treated aqueous stream in the process wherein it originated or, if desired, its discharge into any suitable and available sewer such as rivers, lakes and streams. It has heretofore been proposed to treat these aqueous streams containing a thiosulfate compound with hydrogen sulfide under reduction conditions effective to produce a solution containing a water-soluble polysulfide compound with subsequent recovery of elemental sulfur by decomposition of the polysulfide compound. I have attempted to perfect such a procedure and I have noticed that if the thiosulfate is converted to polysulfide by a reaction with $H_2S$ and an attempt is made to decompose the resulting polysulfide compound by conventional acidification procedures such as stripping with carbon dioxide, substantial loss of the elemental sulfur product is encountered during the polysulfide decomposition step. Without the intention of being bound by any theoretical explanation of this phenomenon, I attribute this loss of elemental sulfur product that occurs in a conventional polysulfide decomposition procedure with carbon dioxide to the back hydrolysis of elemental sulfur product due to a reaction between the freshly formed elemental sulfur and the carbonate and bicarbonate salts formed as the polysulfide decomposition proceeds. In essence I believe that a significant portion of the elemental sulfur present in the polysulfide solution recovered from the $H_2S$ reduction step is lost during the decomposition step due to interaction of the elemental sulfur with the basic cations (or carbonate salts thereof) that are released during the actual decomposition reaction. As will be shown in an example, my experiments on this phenomenon have shown that 40 to 50 percent of the elemental sulfur present in the solution charged to the decomposition step in the form of polysulfide sulfur can be hydrolyzed therein to water-soluble sulfur products (i.e., principally back to thiosulfate) with resulting substantial decrease in yield of elemental sulfur.

The problem addressed by the present invention is then to provide a method for treating these thiosulfate-containing water streams and for recovering elemental sulfur therefrom which method substantially controls the loss of elemental sulfur product by back hydrolysis of the sulfur product with basic constituents of the treated water stream.

As a result of my investigations of this sulfur yield loss problem, I have formulated a procedure for treating an aqueous stream containing a water-soluble thiosulfate compound which substantially avoids the interaction of the sulfur product with the basic constituents of the treated aqueous stream, thereby enabling a significant increase in the amount of elemental sulfur which can be recovered from such a solution by treatment with $H_2S$. The concept of the present invention is essentially based on my finding that cooling of the effluent stream from the $H_2S$ reduction step is effective to decompose polysulfide and suppress the hydrolysis of elemental sulfur if the cooling is conducted under a positive partial pressure of $H_2S$ and if it accomplished in a relatively rapid manner so that the polysulfide solution does not have a chance to undergo a stabilization reaction. That is, my experiments have shown that there is a short time period during which the polysulfide solution recovered from the $H_2S$ reduction step can be selectively decomposed by cooling if the cooling is performed under an $H_2S$ partial pressure of at least 50 psi. and if the polysulfide has not had time to set to an intractable solution. The duration of this induction period is a function of the type of polysulfide compound involved, its concentration and the other constitutents of the solution; but in general, my finding is that the period is less than one half hour, and preferably less than 10 minutes. Coupled with this finding of an induction period is my additional observation that the sulfur product, once it is formed by the instant cooling procedure, must be separated from the cooled solution under a partial pressure of h$H_2S$. It is only after this sulfur separation step that unreacted $H_2S$ can be safely separated from the resulting treated stream. Thus, the essential point of the present method involves reacting the thiosulfate-containing aqueous solution with sufficient $H_2S$ under conditions selected to form an effluent stream containing the corresponding polysulfide compound and unreacted $H_2S$, followed by rapid cooling of the resulting effluent stream to a temperature where polysulfide decomposes to yield elemental sulfur and separation of the elemental sulfur from the resulting cooled solution before the separation of unreacted $H_2S$.

It is accordingly, an object of the present invention to provide a simple, effective and selective method for treating a water stream containing a water-soluble thiosulfate compound to produce elemental sulfur and a treated water stream of greatly reduced total thiosulfate content while minimizing the loss of elemental sulfur in the polysulfide decomposition step due to back hydrolysis. Another object is to provide a simple method for purifying thiosulfate-containing waste water streams so that they can be reused if desired. Still another object is to provide a method of controlling a source of potential water pollution by chemical, petroleum, steel, paper and the like industries that produce thiosulfate-containing waste water streams.

In brief summary, my invention, in one embodiment, is a method for treating an input aqueous stream containing a water-soluble thiosulfate compound in order to substantially lower the thiosulfate content thereof and to produce elemental sulfur. The initial step of my method is a reduction step and involves reacting the aqueous stream with an amount of $H_2S$ selected to provide greater than 2 moles of $H_2S$ per mole of thiosulfate contained in the aqueous stream. This reduction step is performed at polysulfide formation conditions, including a temperature above the melting point of sulfur and a pressure sufficient to maintain the aqueous stream in the liquid phase, selected to form an effluent stream containing the corresponding polysulfide compound and unreacted $H_2S$. In the next step, the total effluent stream from the reduction step is rapidly cooled to a temperature selected to decompose at least a portion of the resulting polysulfide compound and to form elemental sulfur. This cooling step is conducted without substantially changing the pressure of the effluent stream in order to maintain a positive partial pressure of $H_2S$ on same. The resulting cooled effluent stream is then subjected to a sulfur separation step designed to remove the resulting elemental sulfur therefrom. This sulfur separation step is performed without substantially changing the pressure of the effluent stream. in the final step the pressure of the resulting cooled and separated effluent stream recovered from the sulfur separation step is reduced and it is separated in a gas-liquid separation step into an $H_2S$-containing gas stream and a treated water stream having substantially reduced thiosulfate content.

In another embodiment, the present invention is a method as outlined above in the first embodiment wherein the mole ratio of $H_2S$ to thiosulfate utilized in the reduction step is selected from the range corresponding to about 3.5:1 to about 10:1.

In yet another embodiment the present invention is a method as described above in the first embodiment wherein the temperature utilized in the cooling step is about 25 to about 150° C. below the temperature used in the reduction step.

In still another embodiment, the invention is a method as characterized in the first embodiment wherein the water-soluble thiosulfate compound contained in the aqueous input stream is ammonium thiosulfate or an alkali metal thiosulfate or an alkaline earth metal thiosulfate.

Other objects and embodiments of the present invention are hereinafter disclosed in the following detailed discussion of the input streams, preferred conditions, preferred reactants, output streams and mechanics associated with the essential and preferred steps of the present invention.

The starting point for the instant method is a reduction reaction between the thiosulfate compound contained in the input aqueous stream and hydrogen sulfide. The inorganic thiosulfate compound present in the input aqueous stream is generally present as a water-soluble salt of the relatively common base such as ammonium thiosulfate, the water-soluble alkali metal thiosulfate such as sodium and potassium thiosulfate and the alkaline earth metal thiosulfate such as calcium thiosulfate, magnesium thiosulfate, strontium thiosulfate, and barium thiosulfate. It is, of course, understood that the thiosulfate compound present in the input stream maybe ionized to various degrees in the aqueous solution. For purposes of the present invention, the preferred thiosulfate compounds are ammonium thiosulfate and sodium thiosulfate. In some cases mixtures of thiosulfate compounds may also be present in the input solution. The amount of thiosulfate compounds contained in the input aqueous solution may range from 0.1 wt. percent up to the solubility limit of the particular thiosulfate compound in water at the conditions utilized in the reduction step. More particularly, the thiosulfate compound may be present in this solution in amounts corresponding to about 0.1 to about 30 wt. percent of the solution. For example, excellent results are obtained with a solution containing about 5 to about 25 wt. percent sodium thiosulfate.

The hydrogen sulfide reactant utilized in the reduction step of the present invention may be derived from any suitable source. Relatively pure hydrogen sulfide is available in liquid or gaseous form as a commercial commodity in many areas of the world. Likewise, substantially pure streams of hydrogen sulfide can be manufactured by any of the techniques known in the art for converting either elemental sulfur or a sulfur-containing compound such as $SO_2$ to $H_2S$ such as by a reaction of elemental sulfur or $SO_2$ with hydrogen, a suitable hydrocarbon, carbon monoxide or the like reducing agent at a relatively high temperature under conditions selected to produce $H_2S$. Similarly, elemental sulfur can be reacted with $H_2O$ under certain conditions to produce $H_2S$ (i.e., the reverse of the Claus reaction). An excellent source of a suitable $H_2S$ stream is the product gas stream from the regeneration section of one of the conventional $H_2S$ scrubbing processes such as the Girbitol process, the phosphate process, the phenolate process, the vacuum carbonate process, and the like $H_2S$ scrubbing processes wherein the regeneration step produces a relatively rich overhead gas stream containing $H_2S$. Regardless of the course of the $H_2S$ reactant, it is an essential feature of the present method that it is supplied to the reduction step in an amount in excess of the amount that is consumed therein so that a substantial amount of unreacted $H_2S$ appears in the effluent from this step. Ordinarily, this means that hydrogen sulfide must be supplied in an amount greater than 2 moles of $H_2S$ per mole of thiosulfate contained in the input aqueous stream, with the preferred amount selected from the range to about 3.5:1 to about 10:1. It is to be noted that the unreacted $H_2S$ present in the effluent stream from this initial step is recovered in accordance with the present invention after the polysulfide compound is decomposed and sulfur is separated. The resulting $H_2S$-containing gas stream is preferably recycled to the reduction step in order to supply at least a portion of the $H_2S$ reactant consumed therein.

In accordance with the present invention, the first step of the method is a reduction step wherein the aqueous stream is reacted with hydrogen sulfide at polysulfide formation conditions. These conditions include a temperature substantially above the melting point of sulfur and more particularly a temperature of at least 115° C., and more preferable a temperature to 150° to about 370° C. Ordinarily best results are obtained at a temperature of about 175° to about 250° C. The pressure utilized in this step can be any pressure sufficient to maintain the input aqueous stream in the liquid phase and generally a pressure selected from the range of about 100 to about 5,000 psig. is sufficient. Ordinarily, the contact time of the reactant in this step is not critical and contact times of about 0.01 to about 1 hour are sufficient, with preferred contact times being about 0.05 to about 0.2 hours. Insofar at pH is concerned, it is not a material factor in the production of polysulfide except that it is necessary to control the pH of the input aqueous stream in a range sufficient to insure that the effluent stream from this step is sufficiently alkaline to allow the polysulfide compound to exist therein. Since the pH of the input solution ordinarily tends to increase during the course of the thiosulfate reduction reaction, the pH requirement is typically automatically satisfied. Excellent results are obtained in this step at conditions including a temperature of 150° C., a pressure of 690 psig. and a contact time of 6 minutes with an input stream containing ammonium thiosulfate. Similarly, good results have been obtained when the input stream containing sodium thiosulfate at conditions including a temperature of 200° C., a pressure of 790 psig with a contact time of about 15 minutes.

This reduction step can be carried out in any suitable manner taught in the art for contacting a liquid stream and a gas stream. Ordinarily, the reaction zone will contain suitable means for effecting intimate contact between the gas stream and the liquid stream such as baffles, plates, trays, screens, any of the known packing materials and other well-known devices. The thiosulfate-containing aqueous stream can be passed into the reduction zone in either upward, radial or downward flow with the hydrogen sulfide gas stream being simultaneously introduced into the zone in concurrent flow relative to the aqueous stream. A particularly, preferred embodiment involves downflow and concurrent flow of the aqueous stream and the hydrogen sulfide stream through the reaction zone.

Although it is not essential, this reduction step can be carried out with any suitable reduction catalyst known to be capable of accelerating the reduction of a thiosulfate compound with a hydrogen sulfide reactant. It is to be understood that this reaction does not require a catalyst and my findings are that perfectly good results are obtained without the use of a catalyst; however, under certain circumstances a catalyst can serve both the function of promoting contact between the aqueous stream and the gas stream and of sharply accelerating the basic polysulfide formation reaction so that it can be performed at lower temperatures. Based on my investigations of catalyts for this reaction, I have ascertained that particularly good results are obtained with a catalyst comprising a metallic component selected from the group consisting of the transition metals of Groups VI and VIII of the Periodic Table such as chromium, molybdenum, tungsten, iron, cobalt nickel, platinum, palladium and the like. This catalytic ingredient may be utilized in the form of a water-soluble salt of the metal added to the aqueous solution to be treated or it may be combined with a suitable carrier material and utilized according to any of the methods known to the art for effecting a catalytic reaction with a solid catalyst such as a moving bed type of operation, a fluidized bed type of operation or a fixed bed system. I have found best results when the catalyst is utilized as a fixed bed maintained in the reaction zone by suitable supporting screens. A preferred embodiment of the present invention involves the use in the reduction step of a fixed bed of a catalyst comprising a combination of catalytically effective amounts of an oxide or sulfide of a Group VI or Group VIII transition metal combined with a suitable porous support such as any of the refractory inorganic oxides or any of the commonly available carbonaceous materials generally used for this purpose. Preferred supports are alumina and activated carbon. In general, the metallic component is preferably combined with the carrier material in amounts sufficient to result in a catalyst containing about 0.01 to about 20 wt. percent of the metallic component, calculated as the elemental metal. For this particular reaction, I have obtained good results with a catalyst comprising cobalt sulfide combined with alumina or activated carbon in amounts sufficient to result in a catalyst containing about 1 to about 10 wt. percent cobalt. This reduction catalyst can be prepared according to any of the techniques known to those skilled in the catalyst formation art with an impregnation procedure with a water-soluble, decomposable compound being preferred.

In the embodiments of the present invention wherein a catalyst is utilized in the reduction step, suitable liquid hourly space velocities are selected from the range of about 0.01 to about 10 hr.$^{-1}$, with a preferred value being with 0.25 to about 2 hr.$^{-1}$.

Following the reduction step, the total effluent stream therefrom containing the polysulfide compound and unreacted $H_2S$, is passed through a suitable cooling means designed to rapidly drop the temperature thereof to the point where polysulfide is decomposed to form significant amounts of elemental sulfur. One feature of the present invention is that this cooling step is performed relatively rapidly after the effluent stream is withdrawn from the first step. By the use of the expression "relatively rapidly" it is intended to mean that this cooling step is performed within 30 minutes of the time that the effluent stream is withdrawn from the reduction zone, and preferably within less than 10 minutes. Another feature of this cooling step is that it is performed on the total effluent from the reduction zone which, because excess $H_2S$ was used therein, contains unreacted $H_2S$ in an amount sufficient to produce a substantial $H_2S$ partial pressure. It is generally preferred to use sufficient excess $H_2S$ in the reduction step to result in a partial pressure of $H_2S$ of at least 50 psi. Another essential feature of this cooling step is that the pressure of the effluent stream from the reaction zone is not allowed to substantially change during the cooling operation; that is, the cooling step is performed at substantially the same pressure (except of course for the normal pressure drop encountered in a continuous system) reduction step. Ordinarily, the temperature to which the effluent stream is cooled is about 25° to about 150° C. below the inlet temperature used in the reduction step, with the preferred temperature being just above the melting point of sulfur (which is generally stated to be about 115° C). If the temperature of the effluent stream during this cooling operation is maintained above the melting point of sulfur, the separation of sulfur from the resulting solution in the subsequent sulfur separation step will be facilitated; otherwise if solid elemental sulfur is allowed to form it is ordinarily very finely divided sulfur in a colloidal form which can be very difficult to separate from the treated aqueous stream. Ordinarily, the degree of polysulfide decomposition can be controlled by carefully adjusting the temperature to which the effluent stream is cooled. Depending somewhat on the particular thiosulfate compound, the exact conditions utilized in the polysulfide formation step and the nature of the other ingredients of the input aqueous solution, the differential temperature drop in this cooling step effective to decompose substantially all of the polysulfide is ordinarily in the range of about 25° to about 150° C. The cooling means utilized to effect this cooling step can be any conventional cooling means known to those skilled in the art, with preference shown, of course, for the design that allow the maximum temperature drop in the effluent stream with minimum pressure drop.

After this quench step, the resulting cooled effluent stream contains elemental sulfur, a water-soluble sulfide compound, such as ammonium hydrosulfide, sodium hydrosulfide and the like, unreacted $H_2S$ and trace amounts of unreacted thiosulfate compound. In cases where it is not desired to completely decompose the polysulfide compound formed in the reduction zone, the cooled effluent stream may contain some minor amounts of polysulfide. In accordance with the present invention, the resulting cooled effluent stream is then passed to a suitable separating zone wherein elemental sulfur contained therein is removed without substantially changing the pressure of this stream. That is, while still maintaining this stream under a partial pressure of $H_2S$. In the case where the elemental sulfur is present in this stream in liquid form, a simple phase separation in a settling tank is ordinarially sufficient to separate the liquid sulfur phase from the other constituents of this stream. If the temperature drop in the cooling step has been sufficient to produce solid sulfur, the solid sulfur is separated in this step according to any of the techniques known in the art for separating a solid from the liquid under pressure such as filtration, centrifuging and the like procedure. In either case, a sulfur product stream will be recovered during this step and it can be utilized for any of the known commercial uses of sulfur or converted to one of the sulfur-containing products used in industry such as sulfuric acid. Also withdrawn from this step is an aqueous stream comprising the cooled and substantially elemental sulfur-free effluent stream from the first step. This aqueous stream is a mixture of gas and liquid and it is then charged to the final step of the present invention, the liquid-gas separation step.

The liquid-gas separation step performed on the aqueous stream withdrawn from the sulfur-separation step is ordinarily accomplished by reducing the pressure of the stream to a value approximating atmospheric and separating the resulting stream in a conventional gas-liquid separating zone into an $H_2S$-containing gas overhead stream and a treated water bottoms stream having a substantially reduced thiosulfate content. The $H_2S$-containing overhead gas stream is withdrawn from the separating zone and can, if desired, be passed back to the reduction step in order to furnish at least a portion of the $H_2S$ reactants utilized therein. In addition, a portion of this overhead stream can be passed to the cooling step in order to adjust $H_2S$ partial pressure at that point if desired. The treated water stream recovered from this last step is substantially reduced in thiosulfate content and this ordinarily means that 80 to 90 percent or more of the thiosulfate originally present therein has been removed. For example, operation of the present invention on a water stream containing sodium thiosulfate results in the reduction of the thiosulfate content of the water stream by 93 percent is subsequently explained in one of the examples. The treated water stream, while containing substantially less thiosulfate, will contain a water-soluble sulfide compound due to release of basic cations during the thiosulfate reduction procedure — for example, when the input aqueous stream contains ammonium thiosulfate, as sodium thiosulfate, the treated aqueous stream will contain ammonium hydrosulfide as sodium hydrosulfide, respectively. In addition, in the case where the cooling step of the present invention is operated in a manner so that not all of the polysulfide is decomposed therein, this treated stream may have some minor amounts of residual polysulfide contained therein. If it is desired to further purify this treated stream by removing sulfide and polysulfide therefrom, it can be easily accomplished by any sulfide removal means known to those skilled in the art such as by a suitable stripping operation with an acid gas such as $CO_2$. It is to be noted that in many cases the treated aqueous stream is to be reused in a process where the presence of sulfide compounds therein is not objectionable; consequently, removal of sulfide is not required in all cases.

EXAMPLE I

In order to demonstrate an importance of the presence of $H_2S$ during the sulfur separation step of the present invention, two experiments were performed in which the effect of $H_2S$ partial pressure on the recovery of elemental sulfur from a freshly decomposed polysulfide solution was studied.

In the first experiment, a simulated partially decomposed polysulfide solution was prepared by mixing 80 grams of finely divided elemental sulfur with 260 cc. of an aqueous solution containing 0.016 wt. percent sodium sulfide along with an equivalent amount of sodium bicarbonate. The resulting solution was heated in an appropriate vessel to 125° C. under 30 psig. of nitrogen for about one-half hour. A liquid sulfur phase was then withdrawn from the vessel and found to contain 43 grams of elemental sulfur. This result indicated that about 37 grams of the elemental sulfur originally charged to the vessel was hydrolyzed therein to sodium polysulfide. That is, about 46 percent of the elemental sulfur present in the simulated effluent from the polysulfide decomposition step was lost by back hydrolysis in the sulfur separation step when the elemental sulfur is just simply separated from the treated solution.

The second experiment was conducted according to the method of the present invention and essentially involved the addition of 70 psi of $H_2S$ to the separation vessel. The experiment repeated above was then repeated with this modification and it was found that 72 grams of the elemental sulfur was recovered. Thus the effect of performing this sulfur separation step under an $H_2S$ partial pressure was to increase the yield of elemental sulfur by a factor of about 1.7 or by 67 percent relative to the control run.

EXAMPLE II

A water stream, containing 18.2 wt. percent sodium thio-sulfate and 0.6 wt. percent sodium hydroxide, is heated by a conventional heating means to the temperature of about 350° F. The pressure of the resulting heated stream is then raised by a conventional pumping means to the value of about 790 psig. The resulting heated and high pressure aqueous stream is then admixed with a gas stream containing 91 mole percent $H_2S$, 4.8 mole percent $CO_2$ and 4.2 mole percent $H_2O$. The temperature of the gas stream is about 100°F. and its pressure is about 780 psig. The resulting mixture is then passed into the top of a conventional, vertically positioned reduction zone containing a fixed bed of a reduction catalyst comprising a catalytically effective amount of cobalt sulfide combined with an activated carbon carrier material. More particularly, the catalyst comprised about 2.3 wt. percent cobalt as cobalt sulfide combined with 10 to 30 mesh particles of activated carbon. The inlet temperature and pressure of the reduction zone are fixed at about 350° F. and about 780 psig, respectively. In addition, the flow rate of the aqueous solution is adjusted to achieve a liquid hourly space velocity of about 1.5 hrs.$^{-1}$ based on the volume of the catalyst bed.

An effluent stream is then withdrawn from the bottom region of the reduction zone and found to be at a temperature of about 392° F. and at a pressure of about 770 psig. The positive differential temperature across the reduction zone is of course caused by the exothermic reaction taking place therein; likewise, the negative differential pressure is caused by the pressure drop associated with the internals of the reduction zone. The relative rates of circulation of the liquid stream and the gas stream through the reduction zone are adjusted to result in the mole ratio of $H_2S$ to sodium thiosulfate entering the reduction zone per unit time of about 5.6:1. Analysis of the total effluent stream from the bottom of the reduction zone indicates that it contains, 0.6 wt. percent unreacted $H_2S$ 0.04 wt. percent $CO_2$, 1.06 wt. percent sodium thiosulfate, 1.6 wt. percent sodium bicarbonate and 20.9 wt. percent sodium polysulfide.

In accordance with the present invention, the total effluent stream from the reduction zone is then quickly passed to a conventional cooling zone wherein its temperature is dropped to about 250° F. while its pressure is maintained constant at about 770 psig. The flow rate of this effluent stream and the distance between the reduction zone and the cooling zone are adjusted so that the cooling of the effluent occurs within 5 minutes after the effluent leaves the bottom of the reduction zone. This cooling step corresponds to a reduction in the temperature of the effluent stream of about 142° F. and is effective to decompose the polysulfide solution and release substantial quantities of elemental sulfur. It is to be noted that this cooling step occurs under a partial pressure of $H_2S$.

The resulting cooled effluent stream, now containing elemental sulfur, is then passed into a conventional sulfur separating zone where a liquid sulfur phase is allowed to separate from the cooled effluent stream. In accordance with the present invention the separating zone is maintained under a pressure of 770 psig. and a positive partial pressure of $H_2S$.

A stream of substantially pure, liquid elemental sulfur is then withdrawn from the lower region of this sulfur separating zone. A supernatant liquid also withdrawn from the upper region of this sulfur separating zone and passed through a suitable pressure reduction means to a gas-liquid separating zone maintained at a temperature of about 250° F. and a pressure of 50 psig. A gas phase is allowed to separate from the liquid phase in this last separating zone and the gas phase is withdrawn as an overhead stream and the liquid phase comprises the bottoms stream. The overhead gas stream comprises primarily $H_2S$ admixed with some $H_2O$ and $CO_2$, and it is withdrawn from the separating zone, admixed with additional makeup $H_2S$ and passed back through suitable compressing means to the reduction zone in order to provide the gas stream used therein. The liquid phase is likewise withdrawn from this last separating zone and it comprises the treated water product stream of the present invention. An analysis of the treated water stream indicates it contains about 1 wt. percent sodium thiosulfate. Calculations based on the disappearance of the thiosulfate indicate that about 93 percent of the thiosulfate present in the input water stream charged to the reduction zone is eliminated by the method of the present invention in this particular case.

It is intended to cover by the following claims all changes, modifications and variations of the above disclosure of the present invention that would be self-evident to one of ordinary skill in the water-treating art.

I claim as my invention:

1. A method for treating an aqueous stream containing a water-soluble thiosulfate compound to substantially lower the thiosulfate content thereof and to produce elemental sulfur, said method comprising the steps of:

a. reacting the aqueous stream with an amount of $H_2S$ selected to provide greater than 2 moles of $H_2S$ per mole of thiosulfate contained in the aqueous stream at polysulfide formation conditions, including a temperature above the melting point of sulfur and a pressure sufficient to maintain the aqueous stream in the liquid phase, selected to form an effluent stream containing the corresponding polysulfide compound and unreacted $H_2S$;

b. rapidly cooling the total effluent stream from step (a) to a temperature selected to decompose at least a portion of the resulting polysulfide compound and form elemental sulfur without substantially changing the pressure of the effluent stream;

c. subjecting the resulting cooled effluent stream to separation conditions effective to remove elemental sulfur therefrom without substantially changing the pressure of the effluent stream; and d. reducing the pressure of the resulting cooled and separated effluent stream and further separating same into an $H_2S$-containing gas stream and a treated water stream having a substantially reduced thiosulfate content.

2. A method as defined as in claim 1 wherein the water-soluble thiosulfate compound is ammonium thiosulfate.

3. A method as defined as in claim 1 wherein the water-soluble thiosulfate compound is an alkali metal thiosulfate compound.

4. A method as defined in claim 3 wherein the alkali metal thiosulfate compound is sodium thiosulfate.

5. A method as defined in claim 3 wherein the alkali thiosulfate compound is potassium thiosulfate.

6. A method as defined as in claim 1 wherein the water-soluble thiosulfate compound is a water-soluble alkaline earth metal thiosulfate compound.

7. A method as defined in claim 6 wherein the alkaline earth metal thiosulfate compound is calcium thiosulfate.

8. A method as defined in claim 1 wherein the mole ratio of $H_2S$ to thiosulfate compound utilized in step (a) is selected from the range corresponding to about 3.5:1 to about 10:1.

9. A method as defined in claim 1 wherein the temperature utilized in step (a) is selected from the range of about 150° to 370° C. and the pressure utilized is selected from the range of about 100 to about 5,000 psig.

10. A method as defined as in claim 1 wherein at least a portion of the gas stream formed in step (d) is passed to step (a) in order to furnish a portion of the $H_2S$ reactant utilized therein.

11. A method as defined in claim 1 wherein the temperature utilized in step (b) is about 25° to about 150° C. below the temperature used in step (a).

12. A method as defined in claim 1 wherein the temperature utilized in step (b) is just above the melting point of sulfur.

* * * * *